(12) United States Patent
Osswald et al.

(10) Patent No.: US 7,698,940 B2
(45) Date of Patent: Apr. 20, 2010

(54) APPARATUS FOR DETERMINING AND/OR MONITORING THE FILL LEVEL OF A MEDIUM IN A CONTAINER

(75) Inventors: Dirk Osswald, Schopfheim (DE); Ralf Reimelt, Freiburg (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 570 days.

(21) Appl. No.: 10/546,985

(22) PCT Filed: Feb. 10, 2004

(86) PCT No.: PCT/EP2004/001217

§ 371 (c)(1),
(2), (4) Date: Jan. 31, 2008

(87) PCT Pub. No.: WO2004/076982

PCT Pub. Date: Sep. 10, 2004

(65) Prior Publication Data

US 2008/0134778 A1    Jun. 12, 2008

(30) Foreign Application Priority Data

Feb. 26, 2003   (DE)   ................ 103 08 495

(51) Int. Cl.
    *G01F 23/26*    (2006.01)
(52) U.S. Cl. .................................. 73/304 C
(58) Field of Classification Search ........... 73/304 C
    See application file for complete search history.

(56) References Cited

U.S. PATENT DOCUMENTS

| | | | | |
|---|---|---|---|---|
| 4,574,328 A | * | 3/1986 | Maier | ................ 361/284 |
| 4,757,252 A | * | 7/1988 | Maltby et al. | ................ 324/687 |
| 5,701,932 A | * | 12/1997 | Bourscheid et al. | ......... 137/558 |
| 5,880,698 A | | 3/1999 | Burger | |
| 5,955,684 A | | 9/1999 | Gravel | |
| 6,011,400 A | | 1/2000 | Nicolas | |
| 6,019,007 A | | 2/2000 | Grieger | |
| 6,148,681 A | * | 11/2000 | Gravel et al. | ................ 73/866.5 |
| 6,178,817 B1 | | 1/2001 | Hewelt | |
| 6,250,136 B1 | | 6/2001 | Igreja | |
| 6,386,055 B1 | | 5/2002 | Eason | |
| 6,614,391 B1 | | 9/2003 | Burger | |

(Continued)

FOREIGN PATENT DOCUMENTS

DE         3345116        6/1984

(Continued)

*Primary Examiner*—Hezron Williams
*Assistant Examiner*—Rodney T Frank
(74) *Attorney, Agent, or Firm*—Bacon & Thomas, PLLC

(57) ABSTRACT

A device for determining and/or monitoring the fill level of a medium in a container, including: a first conductive element; a second conductive element; and a sealing ceramic. The sealing ceramic being arranged in a region between the two conductive elements, for the purpose of process separation. A first seal, which is provided between the first conductive element and the sealing ceramic, a second seal, which is provided between the sealing ceramic and the second conductive element, and a control/evaluation unit, which determines the fill level of the medium in the container on the basis of a capacitance measurement or on the basis of a measuring of travel time of measurement signals are also included.

14 Claims, 5 Drawing Sheets

U.S. PATENT DOCUMENTS

| | | | |
|---|---|---|---|
| 6,820,510 B2 | 11/2004 | Schroth | |
| 7,255,002 B2 * | 8/2007 | Gravel et al. | 73/290 V |
| 7,467,548 B2 * | 12/2008 | Fredriksson | 73/304 R |
| 2002/0053238 A1 | 5/2002 | Fahrenbach | |

FOREIGN PATENT DOCUMENTS

| | | |
|---|---|---|
| DE | 19728280 | 5/1998 |
| EP | 0 773 433 | 5/1997 |
| EP | 0 929 802 B1 | 7/1999 |

* cited by examiner

APPARATUS FOR DETERMINING AND/OR MONITORING THE FILL LEVEL OF A MEDIUM IN A CONTAINER

FIELD OF THE INVENTION

The invention relates to an apparatus for determining and/or monitoring the fill level of a medium in a container.

BACKGROUND OF THE INVENTION

For determining the fill level of a medium in a container, measuring systems are used, which measure various physical variables. On the basis of these variables, the desired information concerning fill level is subsequently derived. Besides mechanical samplers, capacitive, conductive or hydrostatic measuring probes are used, as well as detectors working on the basis of ultrasonic, microwave or radioactive radiation.

In a large number of areas of application, for example in the petrochemicals, chemicals and foods industries, highly accurate measurements of the fill level of liquids or bulk goods in containers (tanks, silos, etc.) are required. Therefore, in such cases, sensors are increasingly being used, in which short, electromagnetic, high-frequency pulses (TDR-method or pulse-radar method) or continuous, frequency-modulated microwaves (e.g. FMCW-radar method) coupled onto a conductive element, or waveguide, and guided by means of the waveguide into the container in which the fill substance is held. Choices for the waveguides include the known variants of Sommerfeld, Goubau or Lecher.

Since, in an especially preferred embodiment, the invention is adapted for TDR (Time Domain Reflectometry) fill level measuring device, the manner in which such a device works will be explained here in somewhat more detail. From a physical point of view, in TDR measuring devices, the effect is used, wherein, at the interface between two different media, e.g. air and oil, or air and water, due to the abrupt change (discontinuity) in the dielectric constants of the two media, a part of the guided, high-frequency pulses, or the guided microwaves, as the case may be, is reflected and conducted via the conductive element back into a receiving apparatus. The reflected part (the wanted echo signal) is, in such case, greater, the greater the difference in the dielectric constants of the two media. On the basis of the travel time of the reflected part of the high-frequency pulses, or the CW-signals (echo signals), as the case may be, the distance to the upper surface of the fill substance can be determined. With knowledge of the empty distance of the container, the fill level of the fill substance in the container can be calculated. If an interface determination is to be performed, then the position of the interface can be determined on the basis of the measurement results.

SUMMARY OF THE INVENTION

An object of the invention is to provide a fill level measuring apparatus, which is suited for the high temperature range and/or high pressure range. High temperature range, as regards the present invention, means that the apparatus can be used without problem up to a process temperature of about 400° C. High pressure range means that the apparatus of the invention works reliably up to pressures of about 1000 bar.

The object is achieved by an apparatus having the following components:

a first conductive element, a second conductive element and a sealing ceramic, with the sealing ceramic being arranged in a region between the two conductive elements for the purpose of process isolation;

a first seal, which is arranged between the first conductive element and the sealing ceramic;

a second seal, which is arranged between the sealing ceramic and the second conductive element;

a control/evaluation unit, which determined the fill level of the medium in the container on the basis of a capacitance measurement or on the basis of the measuring of the travel time of measuring signals.

In the case of a TDR fill level measuring device, one speaks of the inner conductor in the case of the first conductive element and of the outer conductor in the case of the second conductive element.

Still to be mentioned is that the basic construction of measuring devices, which determine fill level by way of a capacitance measurement or by way of a measurement of the travel time of high-frequency measuring signals, is sufficiently known. Corresponding devices are available from Endress+Hauser, for example, under the references Multicap and Levelflex. In the invention, the known devices are modified, such that they are suited for use in the high temperature range and/or the high pressure range.

In an advantageous further development of the apparatus of the invention, the first conductive element, the second conductive element and the sealing ceramic are arranged essentially coaxially with one another. This construction is typical for many TDR fill level measuring devices, but it is also typical for capacitive measuring devices. It is to be noted, however, that the present invention is not limited to radially symmetric construction. Thus, the two conductive elements can also be arranged parallel to one another, both in the case of a capacitive measuring device and in the case of a TDR fill level measuring device.

In a preferred embodiment of the apparatus of the invention, the first seal and/or the second seal is a soldered seal or a packing gland. In the case of a packing gland, preferably a packing is used, which is made of plural, ring-shaped components of graphite. The favorable properties of this embodiment will be described below in detail.

A further development of the apparatus of the invention bringing significant advantages especially in connection with a TDR fill level measuring device provides at least one cavity in the sealing ceramic. Preferably, the cavity extends approximately coaxially. By this, the characteristic impedance (also referred to as 'characteristic wave impedance' and 'wave resistance') of the feedthrough in the region of the sealing ceramic can be considerably increased, as will likewise be explained in more detail below. In order to give the sealing ceramic, despite the cavity, the requisite radial stability, an advantageous embodiment provides essentially radially extending spokes in the region of the cavity.

For avoiding that the first conductive element, or the waveguide, moves when acted on by axially directed forces, or that bending moments affect the first conductive element, locking elements are provided, which care for a secure and stable emplacement of the first conductive element.

Moreover, it is of great importance for a problemless functioning of the fill level measuring device that the high temperatures existing in the process not reach the electronics, i.e. the control/evaluation unit, on the basis of heat transfer. The high temperatures existing in the process would otherwise lead very quickly to destruction of and thus to a no longer functioning electronics. In a preferred further development of the apparatus of the invention, a temperature reduction unit is therefore provided, which is located in the axial direction in the region between the sealing ceramic and the control/evaluation unit.

As already mentioned, packing glands, especially graphite packing glands, are preferably used in connection with the invention, since these distinguish themselves by excellent elastic, as well as temperature- and pressure-resistant properties. They have, however, e.g. compared to a solder connection, the disadvantage that they are not gas-tight. In order to still seal the measuring device against the encroachment of gas towards the electronics, a glass feedthrough is provided in the region between the temperature reduction unit and the control/evaluation unit. Glass feedthroughs, as such, are best known in the technology of process measurements and are available from the assignee in connection with a multiplicity of measuring devices.

BRIEF DESCRIPTION OF THE DRAWINGS

The invention will now be explained in greater detail on the basis of the drawings, the figures of which show as follows:

FIG. 4b a section taken per the cutting plane B-B of FIG. 4a; and

DESCRIPTION OF THE PREFERRED EMBODIMENTS

Figure 1:
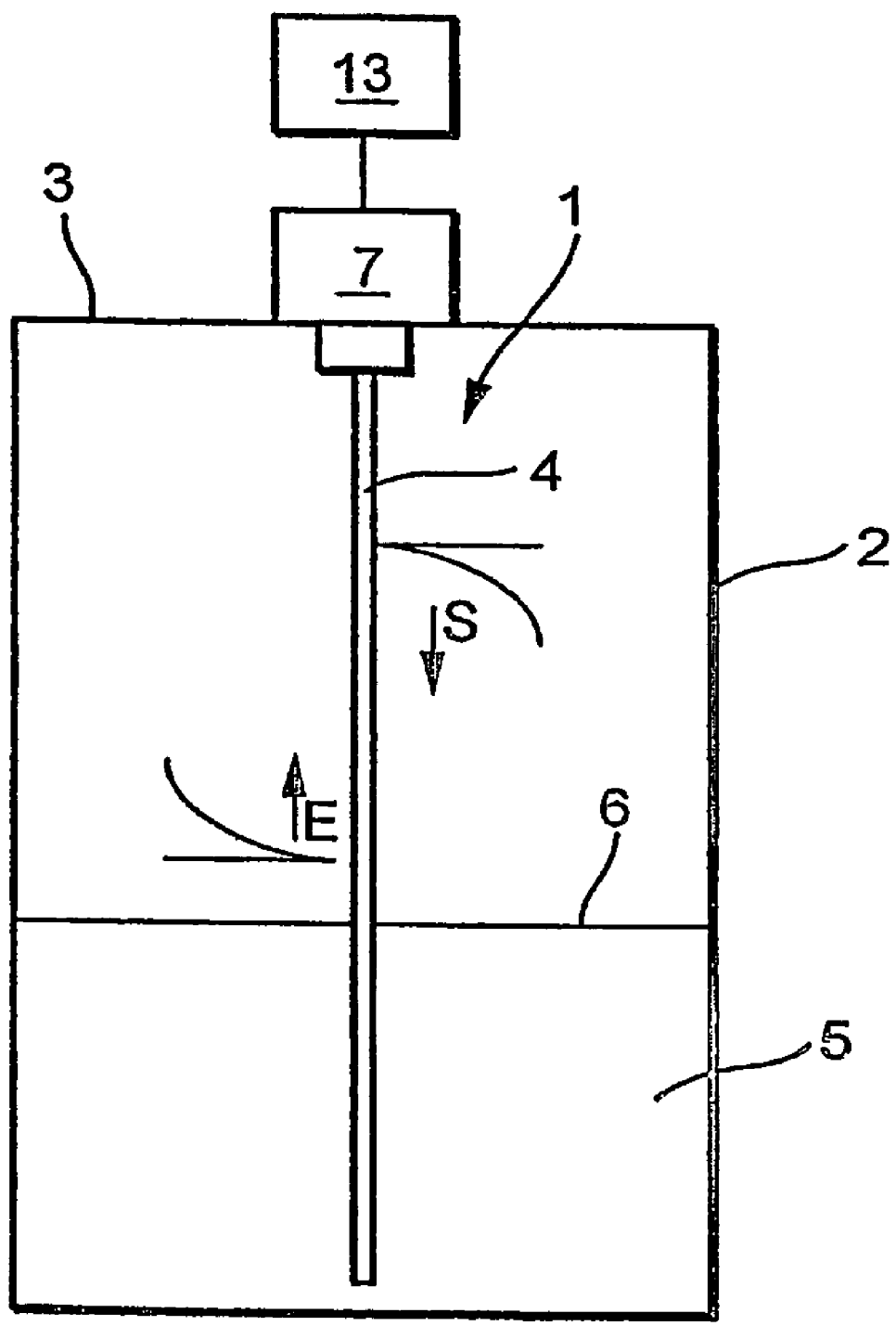
FIG. 1 a schematic representation of a TDR fill level measuring device.

FIG. 1 shows a TDR fill level measuring device 1 mounted on the roof 3 of a container 2 and serving to detect or monitor the fill level of a medium 5 present in the container 2. For this purpose, measuring signals S are produced by the transmitting unit integrated in the control/evaluation unit 13 and coupled via the coupling unit 7 onto the waveguide 4. A measuring signal S is represented in stylized manner in FIG. 1 as a pulse. To support the making of determinations concerning the fill level of the medium 5 in the container 2, the waveguide 4 reaches to the floor of the container 2. Of course, the TDR fill level measuring device can also be placed at another suitable position in/at the container.

In the case of fill level measurement by means of guided, high-frequency, measuring signals, the physical phenomenon is utilized, that a certain fraction E of a high-frequency measuring signal S guided on the waveguide 4 is reflected, as soon as the measuring signal reaches the interface between two media of different dielectric constants. The reflected fraction E is greater, the greater the dielectric constants of the two media differ from one another. One speaks also of an impedance-jump in this connection. An impedance jump occurs, in the illustrated case, when the measuring signal S reaches the surface 6 of the medium 5. The reflected fraction E of the measuring signal shows up as a pronounced peak in the echo curve, i.e. as the so-called wanted echo signal. The echo curve itself represents the amplitudes of the measuring signals as a function of the travel time, or as a function of the traveled distance. The control/evaluation unit 13 determines the travel time of this wanted echo signal and calculated therefrom, for known height of the container 2, the fill level of the medium 5 in the container 2.

On the basis of what has been said above, it is clear that impedance jumps do not only occur where they are of determining importance for the intended fill level measurement by means of the travel time of a measuring signal—thus, in this instance, at the transition 'air, or container atmosphere, to medium 5'. Impedance jumps also appear for the various transitions in the region of the coupling unit 7. Since all of these impedance jumps lead to reflections, which decrease the intensity of the measuring signal S and, therefore, reduce the measurement accuracy, or measurement capability, the coupling unit 7 is embodied such that the impedance, or wave resistance, changes as little as possible over the range, coupling unit 7 to waveguide 4. The transitions, as such, are usually unavoidable, since the measuring signals must be guided from the filigree inner conductor and outer conductor of the coaxial cable 30 onto the stable waveguide 4 of the TDR fill level measuring device 1. A sufficient stability, and, thus, dimensioning, of the waveguide 4 is necessary, since this a) usually has a length of many meters and b) comes in direct contact with the more or less turbulent and aggressive, process medium 5. Moreover, the TDR fill level measuring device 1 of the invention is embodied such that it can be used also for the high temperature and/or high pressure ranges.

Figure 2:
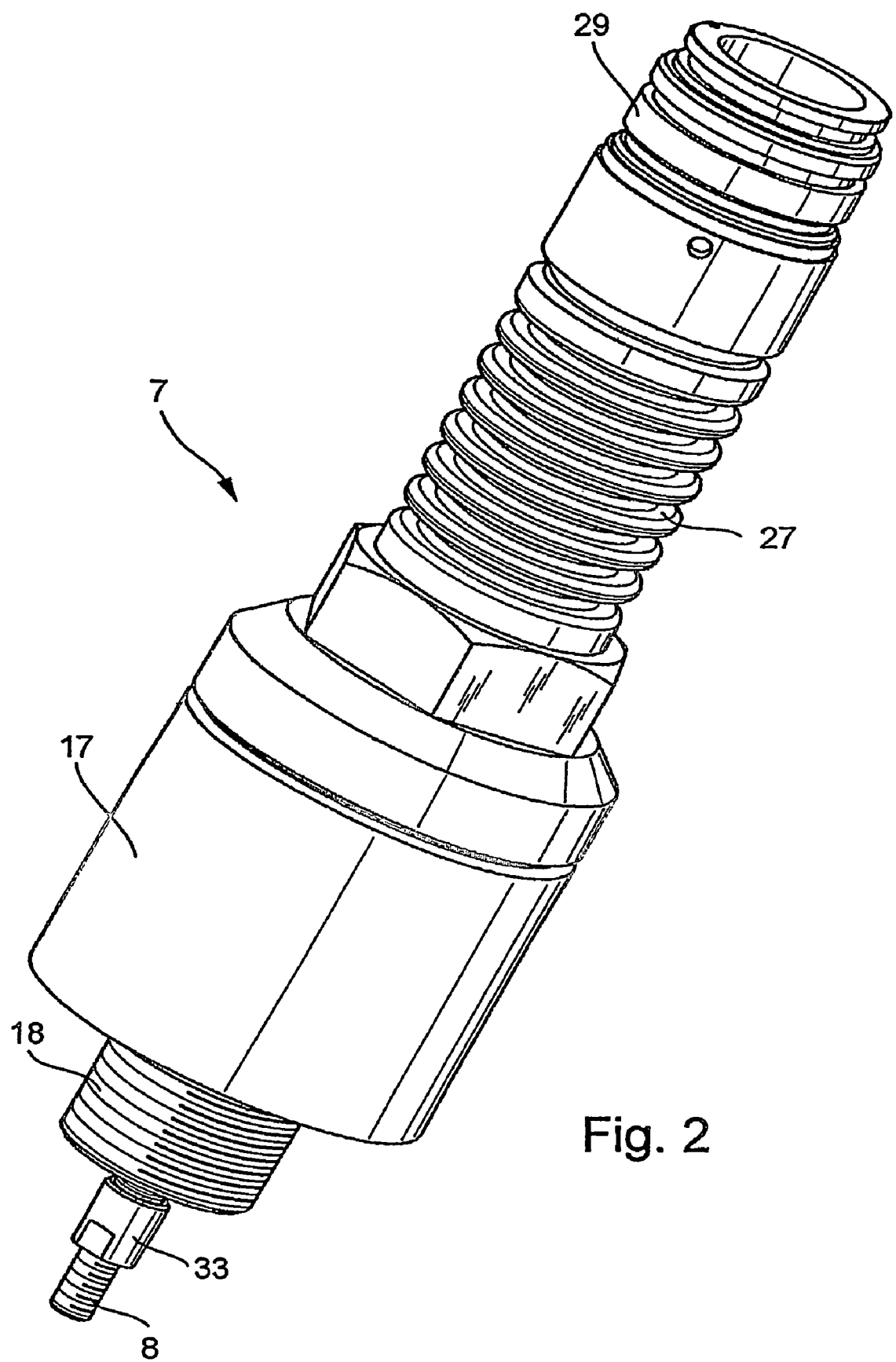
FIG. 2 a schematic, perspective view of a preferred embodiment of the apparatus of the invention.
Figure 3:
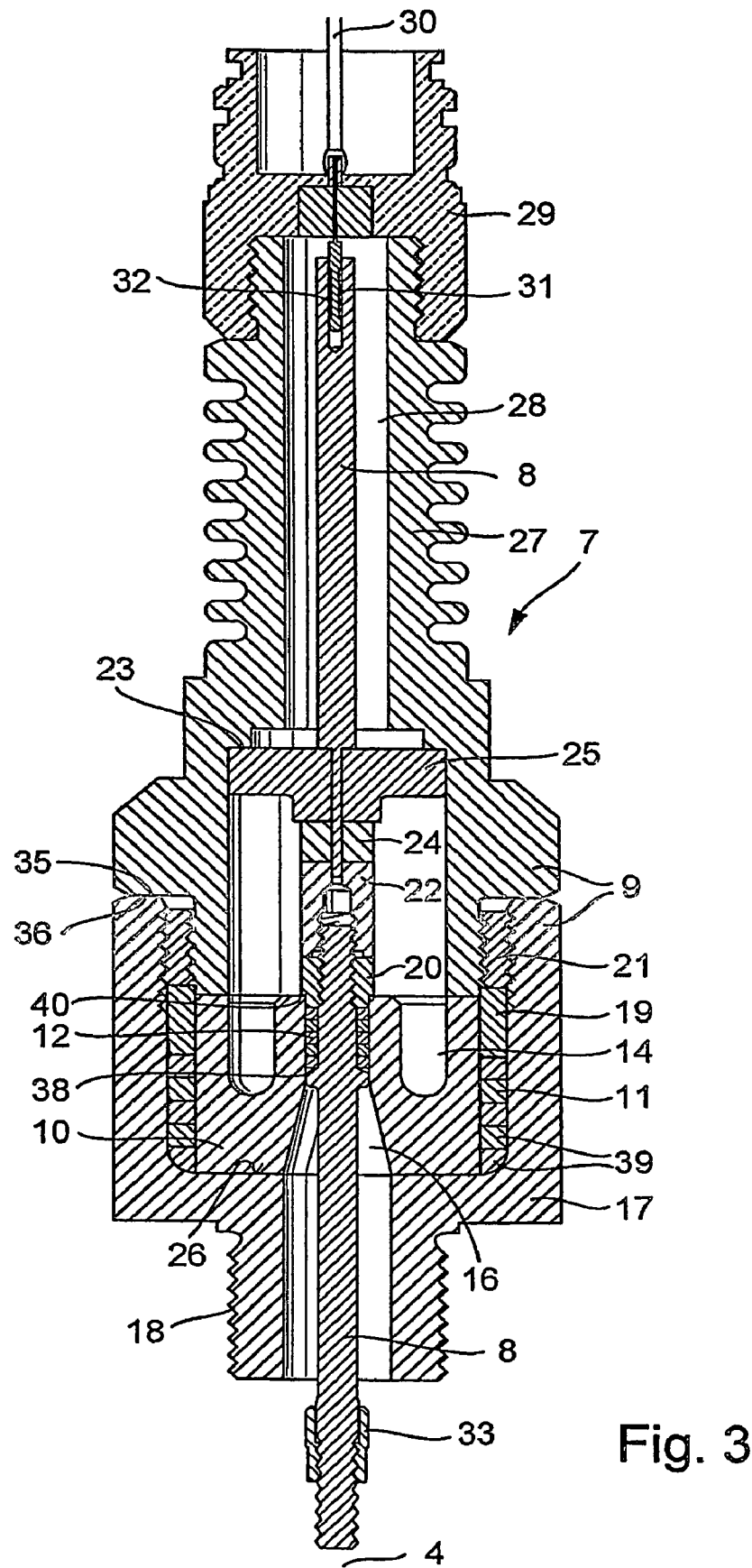
FIG. 3 a longitudinal section of the embodiment of the apparatus of the invention shown in FIG. 2.

FIG. 2 shows a schematic, perspective view of a preferred embodiment of a coupling unit 7, which is best suited for the high temperature and/or high pressure ranges. FIG. 3 shows the coupling unit 7 in longitudinal section. High temperature range means, in connection with the solution of the present invention, that the fill level measuring device 1 is usable without problem up to a process temperature of about 400° C.; high pressure range means that the fill level measuring device 1 works reliably up to pressures of about 1000 bar.

As already said, the coupling unit 7 serves to couple the high-frequency measuring signal delivered from the control/evaluation unit 13, and guided over the coaxial cable 30 composed of inner and outer conductors, as loss-free as possible both onto, and from, the waveguide 4. The waveguide 4 corresponds in this case to the direct extension of the inner conductor 8 of the coupling unit 7 and the coaxial cable 30. Of course, also a so-called direct coupling can be implemented, which does not use a coaxial cable.

The rotational symmetry of the coaxial cable 30 shows up again also in the coupling unit 7: The inner conductor 8 is centrally arranged with respect to the outer conductor 9 of the coupling unit 7. The outer conductor 9 corresponds in the illustrated example to a combination of glass feedthrough 29, temperature reduction unit 27, pot- or cup-shaped housing base 17 and screw-in part 18. The contact surface 38 of the housing base 17 and the contact surface 35 of the temperature reduction unit 27 are preferably welded together.

In the housing base 17, the sealing ceramic 10 has a centrally located feedthrough to accommodate the inner conductor 8. The main purpose of the sealing ceramic, the first seal 11, which seals the sealing ceramic 10 relative to the outer wall of the housing base 17, and the second seal 12, which seals the inner conductor 8 relative to the housing base 17, is the sealing of the two conductive elements 8, 9 of the coupling unit 7 relative to the process, and, indeed, especially in cases where the above-mentioned extreme temperatures and/or pressures exist in the process, i.e., in this case, in the container 2.

The sealing ceramic 10 is preferably made of aluminum- or zirconium-oxide. Of course, any other ceramic sufficiently temperature, pressure and chemically resistant can be used as the sealing ceramic 10. In the case of the seals 11, 12, they are preferably packing glands, such as are available from various manufacturers in a wide variety of constructions for a wide variety of applications. It has been found that graphite packing glands are especially well suited for the high temperature application, since they withstand temperatures up to 550° C. and pressures up to 1000 bar (even 3000 bar in the case of inert atmospheres). Of course, the two seals 11, 12 can be soldered seals, with the solder being matched to the particular conditions of use. Also, one of the seals can be a soldered seal and the other a packing gland, especially a graphite packing gland.

The seal of the coupling unit 7 against the process is distinguished especially by the following advantages:
- it is highly chemically resistant;
- it is highly heat resistant;
- it is highly pressure resistant.

Preferably used in connection with the solution of the invention are packing glands 11, 12 composed of separate ring-elements 39. Packing glands 11, 12 of a plurality of ring elements 39 have, compared with packing glands 11, 12, which have only one ring-shaped element with an appropriately greater height, the advantage that they are successively, separately prestressable. This enables achievement of a highly constant, radial stress over the entire surface to be sealed. In contrast, a single ring element 39 dimensioned to correspond to a plurality of ring elements 39 can only be prestressed inhomogeneously, which leads also to an inhomogeneous radial stress and, consequently, to an inhomogeneous sealing.

The prestressing of packing gland 12, which is located between the inner conductor 8 and the sealing ceramic 10, is accomplished by a compression ring 20. Compression ring 19 and tightening ring 21 serve for prestressing the packing gland 11. The packing gland 11 between housing base 17, i.e. outer conductor 9, and sealing ceramic 10 is, moreover, axially fixed by the compression ring 19 and the tightening ring 21; the packing gland 12 between inner conductor 8 and sealing ceramic 10 is axially fixed by the nut 22 and the lock nut 24 via the ceramic support 25.

As already stated, the seals 11, 12 serve for sealing the inner conductor 8 and the outer conductor 9 of the TDR fill level measuring device 1 reliably, even under extreme conditions, against the process. The sealing ceramic 10 is best suited for the process separation; however, it does have the significant disadvantage that it also represents a dielectric barrier for the high-frequency measuring signals.

To a first approximation, impedance jumps within the coupling unit 7 can be avoided, when the diameter of the outer conductor 9 is 14-times the diameter of the inner conductor 8. Since, for the already stated reasons, the inner conductor 8 must have a certain stability and thus an appropriately large diameter, the outer conductor 9 and thus the coupling unit 7 have substantial dimensions. Devices of such kind are only usable for special applications; additionally, because of the required, correspondingly large amounts of material, they are very expensive and, consequently, unsuited for a mass production. Additionally, the process connection, i.e. the screw-in part 18, must satisfy certain standards. But that is not enough: It is true that, by an appropriately large dimensioning of the sealing ceramic 10, the wave resistance will not change on the meeting of the dielectric barrier; however, there is then the danger that measuring signals of higher modes will be excited, which are not able to propagate on the waveguide 4. Consequently, the intensity of the measuring signal is decreased and the measurement accuracy reduced.

Figure 4:
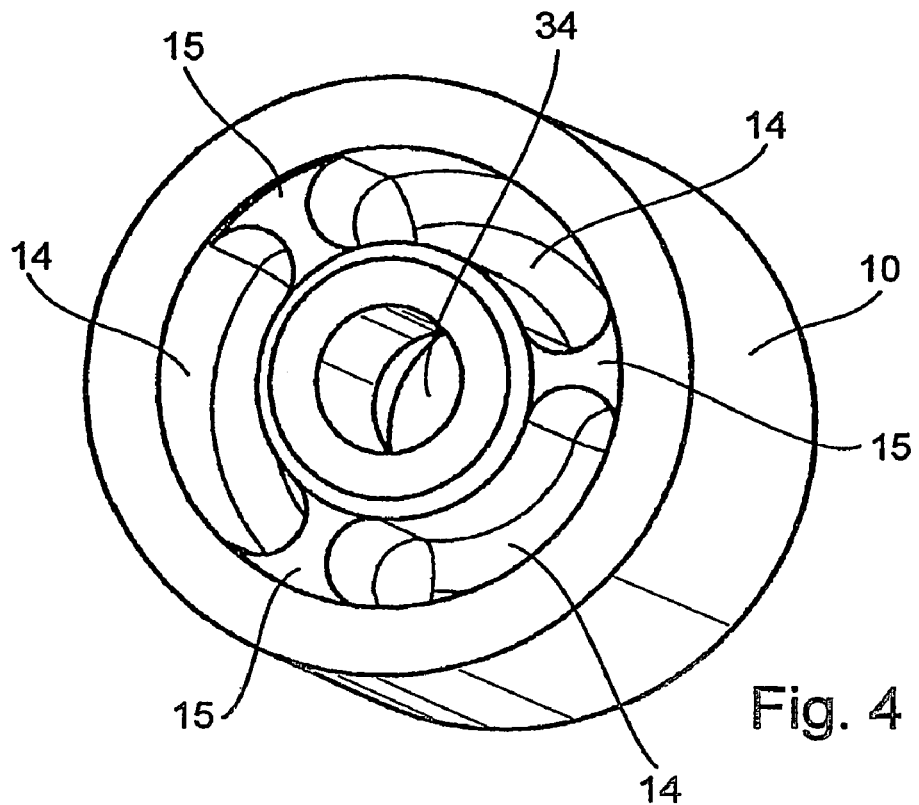
FIG. 4 a perspective view of the sealing ceramic.
Figure 4A:
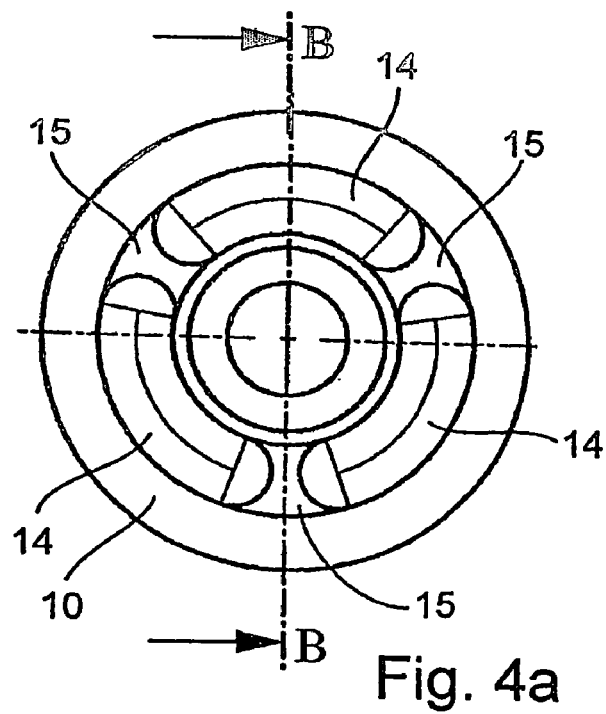
FIG. 4a a plan view of the sealing ceramic shown in FIG. 4.
Figure 4B:
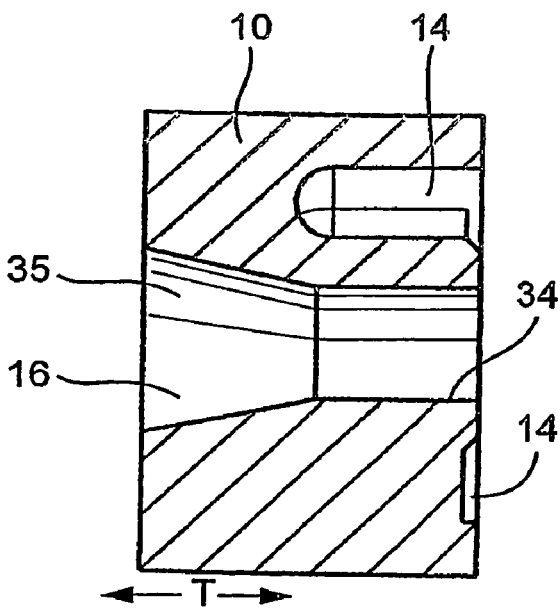

An embodiment of the sealing ceramic 10, which is preferably used in connection with the solution of the invention, is presented in FIGS. 4, 4a and 4b. While FIG. 4 shows a perspective view of the sealing ceramic 10, FIG. 4a is a plan view of the sealing ceramic of FIG. 4; FIG. 4b is a longitudinal section taken on the cutting plane B-B of FIG. 4a.

It has been found that the wave resistance of the sealing ceramic 10 can be significantly increased by providing at least one cavity 14 in the sealing ceramic 10. This cavity, i.e. air gap, is axially arranged in the sealing ceramic 10 and reaches to a maximum depth T into the sealing ceramic 10. Since the sealing ceramic 10 is to effect the process separation, it naturally would not be appropriate to have the cavity 14 extend all the way through, although that would be optimum from the point of view of wave propagation. Thus, in the direction of the process, beyond the depth T, a dielectric barrier stands in the way. This barrier-effect can be minimized by providing, axially in the region of the central bore 34, a widening of the bore 34. Preferably, the widening is conically shaped, with the widening becoming greater in the direction of the process. Essentially, the widening begins at a depth T where the lower limit of the cavity is located.

The conical widening is, however, not a necessary requirement. In principle, the widening can be of any shape. Thus, the widening can have a cylindrical or rectangular cross section. Alternatively to the widening, the inner conductor 8 can be tapered, preferably in the aforementioned region, this achieving a comparable effect to that provided by the widening of the bore 34. In both cases, bracing can be provided, as required, for protecting the inner conductor 8 against bending loads. Preferably, the bracing is provided in the region of the bore 34, the tapering, or on the end of the coupling unit 7 facing the process.

The sealing ceramic 10 is under radial stress, due to the sealing by the packing glands 11, 12. The cavity 14 naturally decreases the stability of the sealing ceramic 10. For increasing such stability of the sealing ceramic, a plurality of radially extending spokes are provided distributed over the surface of the cavity 14.

It has already been mentioned above, that, due to the direct contact of the waveguide 4 with the medium 5, sometimes substantial forces act on the waveguide 4 and, in the final analysis, also on the inner conductor 8. These forces can be axial, tensile or compressive forces, or they can be radially acting forces. These last can lead to a bending moment on the inner conductor 8, which, in the worst case, can result in bending of the inner conductor 8 and loss of the sealing effect of the packing glands 11, 12. Then, the desired process separation is no longer present. For reducing the danger of a twisting/shifting of the inner conductor 8, a support element 25 is provided in the lower, process-near region of the temperature reduction unit 27. The support element 25 is preferably a ceramic support 25. Depending on the temperature conditions at the location where the support element 25 is installed, it can also be made of a non-ceramic, dielectric material. The ceramic support 25 also prevents that the inner conductor 8 can be moved axially upwards—thus in the direction away from the process. Moreover, the compression ring 20, which is connected tightly via a screw-thread with the inner conductor and abuts with the shoulder 40 against the sealing ceramic 10, prevents that the inner conductor 8 can be moved in the direction toward the process.

For the purpose of decoupling the temperature-sensitive electronics, i.e. the control/evaluation unit 13, thermally from the process, temperature reduction unit 27 is provided. The temperature reduction unit 27 is embodied such that it effectively assures that the high temperatures of some hundred degrees Celsius existing in the process do not damage the electronic components. Serving as the dielectric material between the inner conductor 8 and the outer conductor 9 within the temperature reduction unit 27 is air.

Temperature reduction in unit 27 occurs in different ways:

On the basis of the undulating outer surface of the temperature reduction unit 27, heat flow from the process-near end of the fill level measuring device 1 to the process-far end is retarded;

on the basis of the undulating and, consequently, enlarged outer surface area of the temperature reduction unit 27, the heat is effectively given-off to the environment;

the heat transfer to the environment is improved by convection.

Additionally, the heat transfer from the inner conductor 8 to the electronics 13 is reduced by the plug connection 31, 32. Preferably, the plug 31 is embodied as a banana plug, whereby the contact surface area between the plug 31 and the receptacle 32 is reduced to a minimum.

For hermetically separating the electronics 13 from the coupling unit 7, a glass feedthrough 29 is provided. Glass feedthroughs, as such, are known best in the context of process measurement technology and are available from the assignee.

Figure 5:
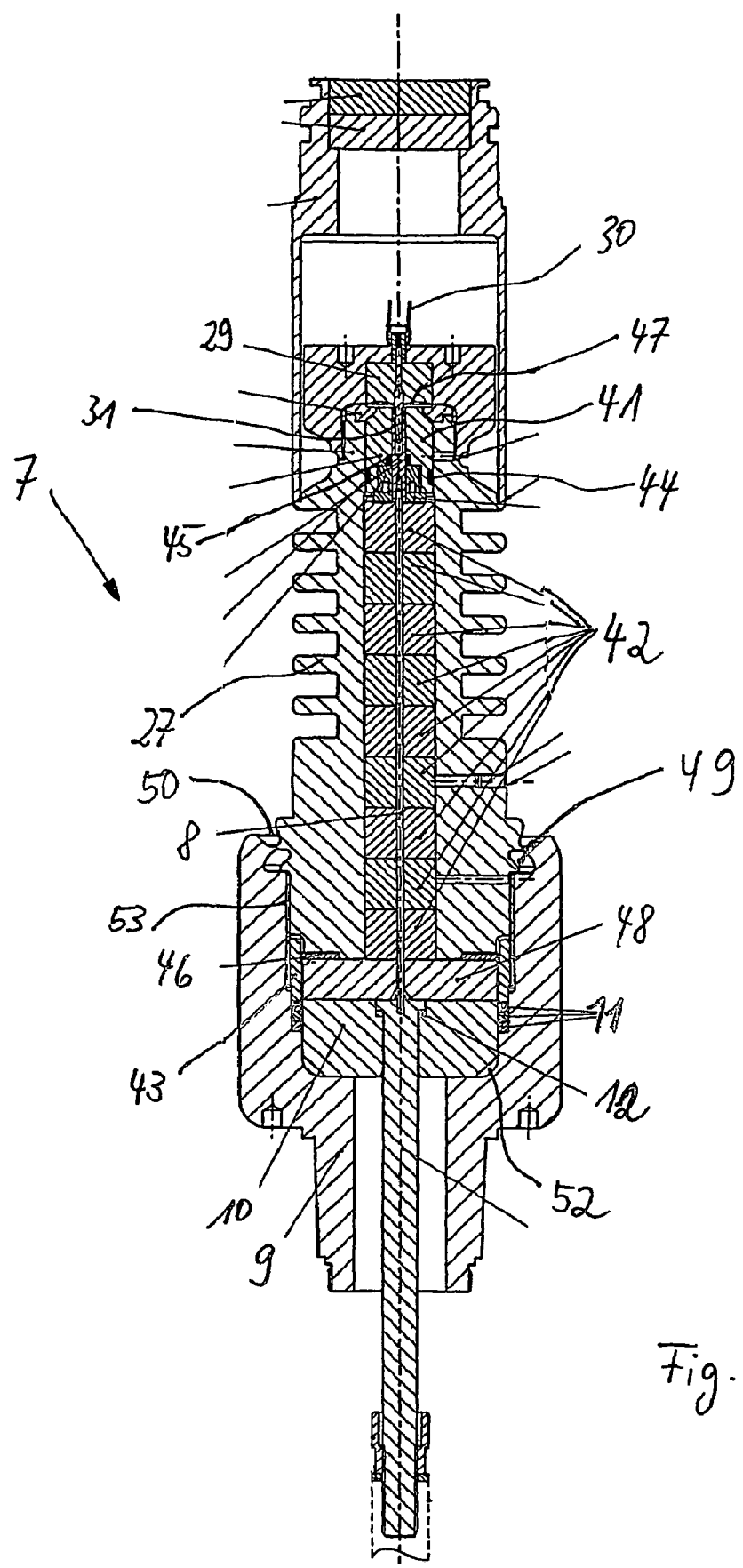
FIG. 5 a longitudinal section of a second preferred form of embodiment of the apparatus of the invention.

FIG. 5 shows a longitudinal section of a second preferred form of embodiment of the apparatus of the invention. In particular, this is a coupling unit 7 for a TDR fill-level measuring device. TDR fill-level measuring devices are available from Endress+Hauser under the mark LEVELFLEX. In the case of the illustrated variant of the invention, such is likewise a coupling unit usable for high pressures and high temperatures. The principal mechanical construction of this coupling unit 7 is largely identical to the construction shown in FIG. 3. Also here, the sealing ceramic 10 serves for the process separation, i.e. it represents an effective barrier against the process medium and separates the interior of the coupling unit 7 from the process in the case of high temperatures and pressures. To assure this secure process separation, a first seal 12 is provided between the inner conductor 8 and the sealing ceramic 10; a second seal 11 is located between the sealing ceramic 10 and the outer conductor 9. Preferably, the seals 11, 12 are graphite packing glands. Of course, seals 11, 12 can also be implemented according to solutions known from the state of the art.

It has also been possible to remove concerns about the chemical durability of the sealing ceramic. Thus, it has been found that the chemical durability of a ceramic depends very significantly on its degree of purity. This, a high purity ceramic with a degree of purity greater than, or equal to, 99.7% is durable against hydrolysis.

The above-described process separation has the disadvantage that it is not gas-tight. This function is fulfilled, however, by the glass feedthrough 29, which hermetically separates the spatial region of the coupling unit 7 facing the process from the spatial region facing away from the process. The glass feedthrough 29 thus has the considerable advantage that it is gas-tight; the disadvantage of a glass feedthrough 29 is that glass does not have the chemical durability of a sealing ceramic 10. In the invention, the two advantages of a sealing ceramic 10 and a glass feedthrough 29 are combined, so that the one can compensate for the disadvantages of the other, with the advantages of the two seals 10, 29 additively sharing in achieving the goals of the invention.

As stated earlier, the glass feedthrough 29 is not very inert in the face of aggressive process media. Since it can not be excluded that, in spite of the sealing ceramic 10, process medium will, with time, penetrate into the spatial region between the sealing ceramic 10 and the glass feedthrough 29 and subsequently damage the glass feedthrough, a supplemental seal 51, especially a plastic seal, is provided in front of the glass feedthrough 29 in the direction of the process. A preferred material for the seal 51 is, moreover, PEEK. The sealing provided by the seal 51 against the inner conductor 8 and the outer conductor 9 is accomplished via the O-rings 44, 45. The seal 51 is optional and has a somewhat redundant sealing function, as follows: If process medium does penetrate, with time, through the sealing ceramic into the interior of the coupling unit 7, seal 51 protects the glass feedthrough 29. For protecting the glass feedthrough 29 against the forces exerted by the process pressure on the seal 51, or the sealing element 41, a metal ring 47 is provided. This metal ring 47 serves as a thrust bearing for the sealing element 41, so that, even in the case of an end surface of the glass feedthrough that is, for manufacturing reasons, not completely planar, no localized stresses can act on the glass.

In the case of the embodiment of the apparatus of the invention illustrated in FIG. 3, the wave resistance of the sealing ceramic 10 was increased by the provision of cavities in the sealing ceramic 10. In such embodiment, therefore, attention was directed toward keeping the wave resistance on the path of the high-frequency measuring signals through the coupling unit 7 as constant as possible and toward avoiding impedance jumps. However, a factor to be considered is that, over longer periods of time, process medium can penetrate into cavities in the interior of the coupling unit 7 and deposit there. These deposits, or collections, do lead, however, to an alteration, in fact a completely uncontrolled alteration, of the wave resistance in the propagation path of the high-frequency measuring signals and, consequently, to measurement errors in the fill level determination.

Therefore, in the embodiment of the apparatus of the invention presented in FIG. 5, the spatial region lying between the sealing ceramic 10 and the glass feedthrough 29, or the seal 51, is essentially completely filled with a dielectric material. By filling all hollow spaces with a dielectric material, a defined state is achieved within the coupling unit. Since empty space is no longer present, deposits of whatever kind can no longer change this defined state. Preferably, the dielectric fill material is a ceramic. In the illustrated case, such is present in the form of ceramic disks 42, each having a central bore which exactly fits the diameter of the inner conductor 8. The only impedance jump occurring within the coupling unit 7 lies in the region of the sealing ceramic at the location where the diameter of the inner conductor 8 makes a jump for achieving the required mechanical strength. This is not a critical factor in the embodiment of FIG. 5, because the rest of the coupling unit 7, as well as the signal path over the coaxial cable 30 to the control/evaluation unit 13 can be designed so as to avoid larger impedance jumps. Therefore, while, it is true that a small part of the wanted signal is lost by the one-time reflection at the impedance jump, nevertheless no multiple reflections occur, which could compromise measurement accuracy in the near region by so-called ringing.

In order to assure a very constant wave resistance in the coupling unit 7, especially those regions in which a high electric field strength occurs must thus be filled with the dielectric material. In contrast, the two cavities 49, 52, for example, disturb the propagation of the measuring signals very little, since, in these regions, which are removed relatively far from the inner conductor 8, the electric field strength is already relatively small. These cavities 49, 52 are, moreover, useful, for equalizing and decreasing stresses, which arise e.g. as a result of the process pressure. Thus, the annular cavity 49 serves to unload the weld seam 50 in cases where mechanical stresses arise. The stresses themselves are transmitted to the screw connection 53.

The invention claimed is:

1. An apparatus suited for the high temperature and/or the high pressure range for determining and/or monitoring the fill level of a medium in a container, comprising:
   a first conductive element;
   a second conductive element;
   a sealing ceramic;
   a first seal, which is provided between said first conductive element and said sealing ceramic;
   a second seal, which is provided between said sealing ceramic and said second conductive element; and
   a control/evaluation unit, which determines the fill level of the medium in the container on the basis of a capacitance measurement or on the basis of the travel time of measuring signals, wherein:
   said sealing ceramic is arranged in a region between said two conductive elements for the purpose of a highly chemical, highly heat and/or highly pressure resistant process separation; and
   a glass feedthrough is provided in the region between said sealing ceramic and said control/evaluation unit.

2. The apparatus as claimed in claim 1, wherein:
   said first conductive element, said second conductive element and said sealing ceramic are arranged essentially coaxially with one another.

3. The apparatus as claimed in claim 1, wherein:
   said first seal and/or said second seal comprise a solder seal.

4. The apparatus as claimed in claim 1, wherein:
   said first seal and/or said second seal comprise a packing gland, which includes at least one annular component.

5. The apparatus as claimed in claim 4, wherein:
   said first seal and/or said second seal comprise a graphite packing gland.

6. The apparatus as claimed in claim 1, wherein:
   blocking elements are provided, which prevent movement of said first conductive element in the axial direction relative to said second conductive element.

7. The apparatus as claimed in claim 1, wherein:
   cavities in the region between said sealing ceramic and said glass feedthrough are at least predominantly filled with dielectric material.

8. An apparatus suited for the high temperature and/or the high pressure range for determining and/or monitoring the fill level of a medium in a container, comprising:
   a first conductive element;
   a second conductive element;
   a sealing ceramic;
   a first seal, which is provided between said first conductive element and said sealing ceramic;
   a second seal, which is provided between said sealing ceramic and said second conductive element; and
   a control/evaluation unit, which determines the fill level of the medium in the container on the basis of a capacitance measurement or on the basis of the travel time of measuring signals, wherein:
   said sealing ceramic is arranged in a region between said two conductive elements for the purpose of process separation; and
   said first conductive element is an inner conductor and said second conductive element is an outer conductor of a TDR fill level measuring device.

9. An apparatus suited for the high temperature and/or the high pressure range for determining and/or monitoring the fill level of a medium in a container, comprising:
   a first conductive element;
   a second conductive element;
   a sealing ceramic;
   a first seal, which is provided between said first conductive element and said sealing ceramic;
   a second seal, which is provided between said sealing ceramic and said second conductive element; and
   a control/evaluation unit, which determines the fill level of the medium in the container on the basis of a capacitance measurement or on the basis of the travel time of measuring signals, wherein:
   said sealing ceramic is arranged in a region between said two conductive elements for the purpose of process separation; and
   at least one cavity is provided in said sealing ceramic.

10. The apparatus as claimed in claim 9, wherein:
    said cavity extends approximately coaxially.

11. The apparatus as claimed in claim 9, wherein:
    the region of said cavity, essentially radially extending spokes are provided.

12. An apparatus suited for the high temperature and/or the high pressure range for determining and/or monitoring the fill level of a medium in a container, comprising:
    a first conductive element;
    a second conductive element;
    a sealing ceramic;
    a first seal, which is provided between said first conductive element and said sealing ceramic;
    a second seal, which is provided between said sealing ceramic and said second conductive element; and
    a control/evaluation unit, which determines the fill level of the medium in the container on the basis of a capacitance measurement or on the basis of the travel time of measuring signals, wherein:
    said sealing ceramic is arranged in a region between said two conductive elements for the purpose of process separation; and
    at least one temperature reduction unit is provided, which is arranged in the axial direction in the region between said sealing ceramic and said control/evaluation unit.

13. An apparatus suited for the high temperature and/or the high pressure range for determining and/or monitoring the fill level of a medium in a container, comprising:
    a first conductive element;
    a second conductive element;
    a sealing ceramic;
    a first seal, which is provided between said first conductive element and said sealing ceramic;
    a second seal, which is provided between said sealing ceramic and said second conductive element; and
    a control/evaluation unit, which determines the fill level of the medium in the container on the basis of a capacitance measurement or on the basis of the travel time of measuring signals, wherein:
    said sealing ceramic is arranged in a region between said two conductive elements for the purpose of process separation; and
    a glass feedthrough is provided in the region between said sealing ceramic and said control/evaluation unit.

14. The apparatus as claimed in claim 13, wherein:
    a further sealing element is provided in front of said glass feedthrough.

* * * * *